Oct. 5, 1937.   I. E. NUTTER ET AL   2,094,926
PILOT VALVE MECHANISM
Filed Nov. 9, 1933   2 Sheets-Sheet 2

INVENTOR.
Irvin E. Nutter
Fletcher E. Martin
BY
ATTORNEY.

UNITED STATES PATENT OFFICE 2,094,926

PILOT VALVE MECHANISM

Irvin Earl Nutter and Fletcher Edward Martin, Whittenburg, Tex., assignors to Phillips Petroleum Company, Bartlesville, Okla., a corporation of Delaware Application November 9, 1933, Serial No. 697,300

2 Claims. (Cl. 251—76)

This invention relates to a new and useful device for automatically controlling liquid levels in various fluid containing tanks or chambers.

Our new invention consists essentially of a pilot valve mechanism which may be actuated by several well known pieces of equipment to accomplish liquid level control in liquid surge tanks, stills, absorbers and other similar pieces of equipment generally found in natural gasoline plants, refineries, oil well separators and in other similar applications, as hereinafter described.

One advantage of our invention is its simple construction and therefore very nominal manufacturing cost.

Another advantage is that better control of liquid level conditions can be obtained with much less equipment than has heretofore been required, with a corresponding saving in installation costs and a great decrease in the difficulties of operation which have been hitherto experienced with conventional types of control equipment.

Figure 1:
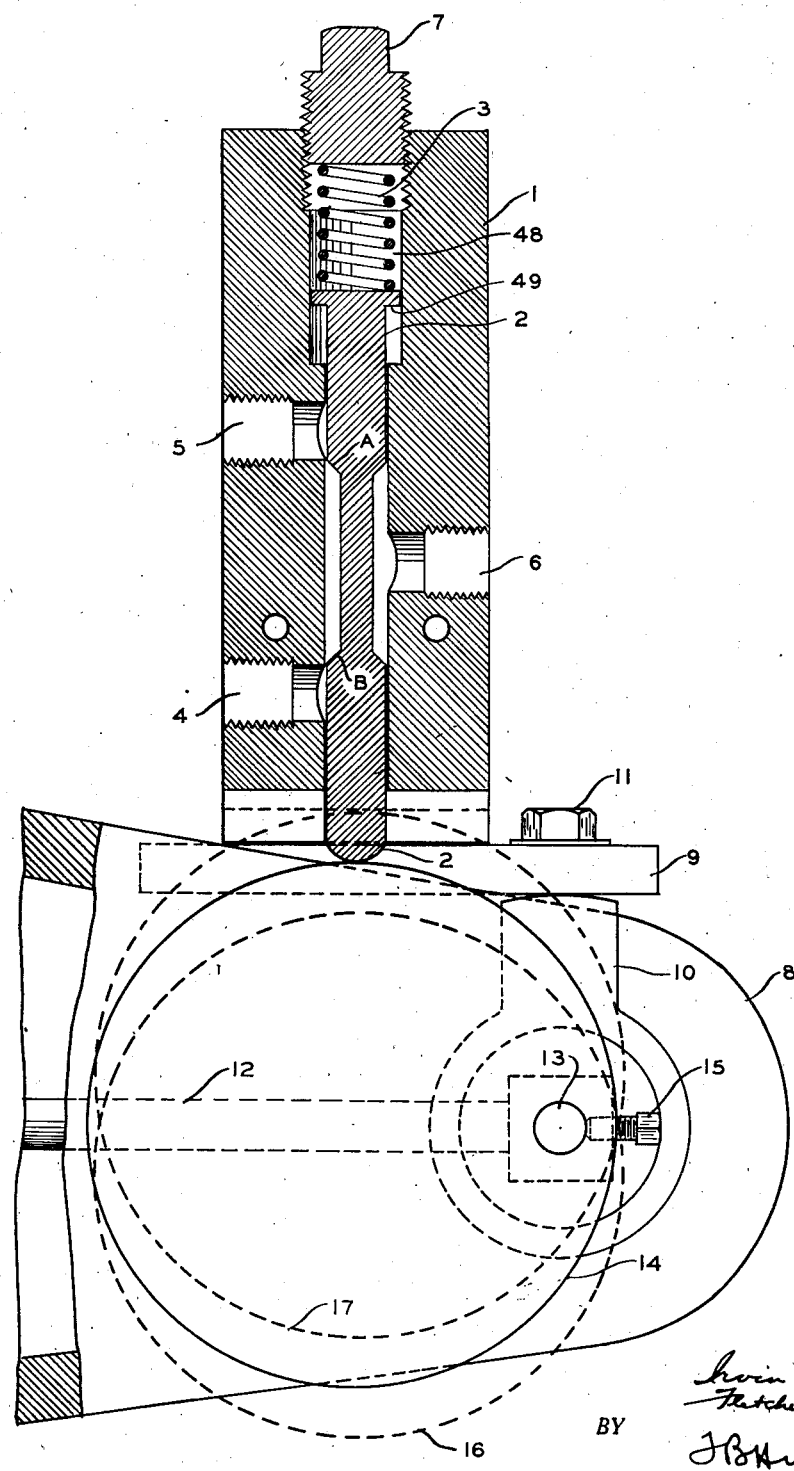
Fig. 1 is a detailed sectional view of the valve mechanism shown in conjunction with a portion of a liquid level control device as more generally illustrated in Fig. 2.

Referring to Fig. 1, the valve device consists essentially of the valve body 1, floating valve pin 2, tension spring 3, pressure supply port 4, vent port 5, operating port 6, and valves A and B. An adjustment nut 7 is provided for adjusting the tension on the spring 3 and for permitting removal of the valve pin 2.

A cylindrical bore 48 passes lengthwise through the valve body 1, the upper portion of the bore 48 being somewhat larger in diameter than the lower portion. The valve pin 2 terminates at its upper end in an enlarged flangelike head 49 which is larger in diameter than the balance of the valve pin 2 and also larger in diameter than the narrower portion of the bore 48, but small enough to fit snugly in the larger portion of the bore 48. In this way the length of travel of the valve pin 2 in a downward direction is restricted. A medial portion of the valve pin 2 is smaller in diameter than the remainder of the pin 2 and flares to the full diameter of the pin 2 at each end of the medial portion, thus forming the valve faces A and B. The distance between the points of widest diameter of the valve faces A and B is equal to the distance between the nearest points of the ports 4 and 5, so that when the valve pin 2 floats in the neutral position as shown in Fig. 1, there will be no passage of pressure fluid between any of the ports 4, 5 and 6 as hereinafter described.

Figure 2:
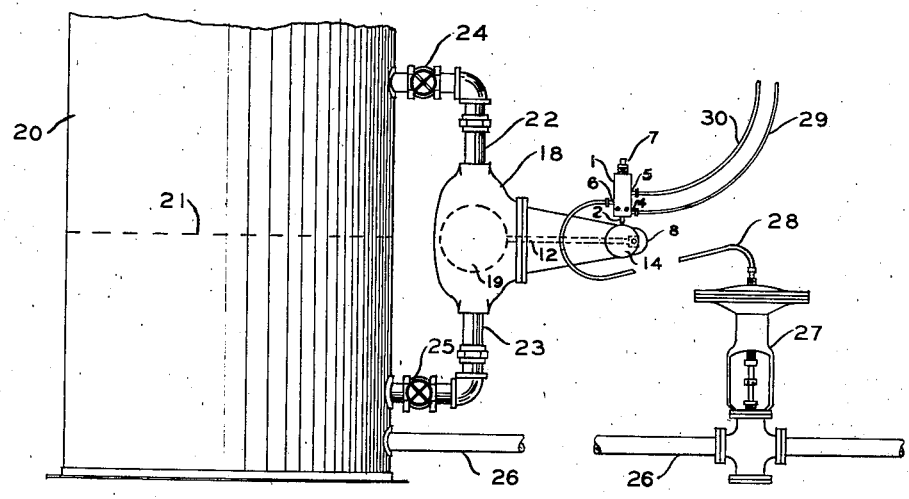
Fig. 2 shows one application of the device for controlling the liquid level in the absorber tower of a natural gasoline plant.

As shown in Figs. 1 and 2 the valve mechanism is mounted on a float arm housing 8 of a liquid level float control device 18 of well known construction, which is mounted in the usual fashion on the side of an absorber tower 20 in which it is desired to maintain a level of liquid as indicated by the dotted line 21. Pipes 22 and 23, in which are mounted valves 24 and 25 respectively, are provided for connecting the float chamber 18 to the absorber tower 20. A liquid withdrawal pipe 26 leads from the absorber tower 20 and a diaphragm operated valve 27 is mounted in the pipe 26 for regulating the withdrawal of liquid from the absorber tower 20. A pressure fluid supply line 28 leads from the diaphragm valve 27 to the operating port 6 of the valve mechanism. A pressure fluid supply line 29 leads from a source of pressure fluid supply, not shown, to the pressure supply port 4 and a vent line 30 leads from the vent port 5. A gaseous fluid may be used as the pressure fluid. The valve body 1 is mounted on a support 9 which is rigidly mounted on the float arm housing 8 by means of the element 10 and the stud bolt 11. The float arm 12 pivots on the element 13 and a circular disc 14 is rigidly fastened to the float arm 12 by means of set screw 15 so as to revolve in an eccentric fashion about the element 13 as the float arm 12 moves up and down with the change in position of the float 19. Dotted circle 16 shows one position of the disc 14 when the float arm lowers and dotted circle 17 shows one position of the disc 14 when the float arm raises. The tension of the spring 3 at all times holds the valve pin 2 in close contact with the edge of the disc 14 regardless of the position of the disc 14.

As illustrated in Figs. 1 and 2 the operation is as follows:

As the level in absorber 20 becomes lower, float 19 of float cage 18 lowers, which in turn revolves eccentric 14 away from body 1, thus allowing valve pin 2 to travel out of body 1 and engaging valve B with pressure port 4. This allows pressure to pass from pressure supply line 29 to operating line 28 then to diaphragm of valve 27. This starts closing off diaphragm valve 27 thus causing the level in the absorber 20 to again rise. As the level in the absorber rises, the action above described is reversed and valve pin 2 rises back to the neutral position such that neither pressuring nor venting from the diaphragm of the diaphragm valve is occurring. If the level in the absorber continues to rise float 19 rotates eccentric 14 so that valve pin 2 is pushed into body 1 engaging valve A with vent port 5. As this occurs pressure is vented from diaphragm of diaphragm valve 27 through operating line 28 thence through operating port 6 thence through vent port 5 out through vent line 30. As this occurs, diaphragm valve 27 opens allowing the rate of flow to increase such that liquid level in absorber 20 is lowered. As these actions continue they finally reach an equilibrium such that the level in the absorber becomes constant and valve pin 2 rests in a neutral position such that neither pressuring or venting is occurring. This condition will continue to exist until the pressure differential of the liquid through diaphragm valve 27 is changed, then a new equilibrium will be established, but the level in the absorber will be the same as before.

The application described above is particularly adaptable to controlling liquid levels in stills, absorbers, vent tanks and accumulators, and maintaining minimum and maximum levels in storage and reservoir tanks on handling any liquid.

In the application shown by Fig. 2, best results are obtained by the use of a reducing regulator on the pressure supply line 29 and controlling this pressure to about two pounds gage above the pressure required to give diaphragm valves full travel, however, if a diaphragm valve of such size is chosen that it handles the capacity in a half open position, very good results are obtained without the use of the reducing regulators on pressure line 29.

We desire to claim all variations in the construction and arrangement of our new device which fairly come within the scope of the appended claims.

What is claimed and desired to be secured by Letters Patent is:

1. In a fluid pressure valve, a body portion, a cylindrical bore of substantially uniform cross-sectional area passing longitudinally through said body portion, two horizontal passages spaced vertically from each other extending from one side of said body portion into communication with said cylindrical bore, a third horizontal passage in communication with said cylindrical bore and extending through the said body portion in a direction opposite to that taken by the said two horizontal passages, said third horizontal passage being positioned intermediate said two horizontal passages, a valve member adapted to fit snugly but slidably without undue friction in said cylindrical bore, one end of said valve member extending beyond said body portion to cooperate with an actuating cam, and the other end of said valve member terminating in a flange-like tip, said valve member having a constricted intermediate section, said intermediate section having a portion at each end flaring to the full diameter of the said valve member, the distance between the points of greatest diameter of the said flaring portions being substantially equal to the distance between the nearest edges of the said two horizontal passages, a spring in the upper portion of the said cylindrical bore for applying tension to the said valve member at the said flangelike tip thereby to hold said valve member extension in contact with said cam and a plug for closing the end of the cylindrical bore beyond the said coil spring.

2. In a fluid pressure valve, a body portion, a cylindrical bore passing through said body portion, one portion of said bore being larger in cross-sectional area than the remainder portion of the said bore, two ports spaced vertically from each other in said body in communication with the said remainder portion of the said bore, a third port in said body in communication with said bore and intermediate said two ports, combined with a valve member adapted to fit snugly in said bore, one end of said member extending beyond said body portion and the other end extending into said larger portion of said bore, the said valve member having a constricted intermediate section, said intermediate section having portions at each end flaring to the full diameter of the said valve member, the distance between the points of greatest diameter of the said flaring portions being substantially equal to the distance between the nearest edges of the said two ports said medial portion being opposite said third port, a spring in the larger portion of the said bore in contact with said valve member and a plug for closing the larger portion of the said bore.

IRVIN EARL NUTTER.
FLETCHER EDWARD MARTIN.